United States Patent
Kim

(10) Patent No.: US 10,084,946 B2
(45) Date of Patent: Sep. 25, 2018

(54) CAMERA MODULE

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/367,889

(22) Filed: Dec. 2, 2016

(65) Prior Publication Data

US 2017/0082866 A1    Mar. 23, 2017

Related U.S. Application Data

(63) Continuation of application No. 14/427,254, filed as application No. PCT/KR2013/000733 on Jan. 30, 2013, now Pat. No. 9,544,481.

(30) Foreign Application Priority Data

Sep. 19, 2012 (KR) .................. 10-2012-0103939

(51) Int. Cl.
| | |
|---|---|
| *H04N 5/232* | (2006.01) |
| *H04N 5/225* | (2006.01) |
| *G02B 27/64* | (2006.01) |

(52) U.S. Cl.
CPC ......... *H04N 5/2254* (2013.01); *G02B 27/646* (2013.01); *H04N 5/2257* (2013.01); *H04N 5/23258* (2013.01); *H04N 5/23287* (2013.01); *H04N 5/23248* (2013.01)

(58) Field of Classification Search
None
See application file for complete search history.

(56) References Cited

U.S. PATENT DOCUMENTS

| | | | |
|---|---|---|---|
| 2007/0113653 A1* | 5/2007 | Nasiri | ............... G01P 1/023 73/510 |
| 2009/0033751 A1 | 2/2009 | Hasuda | |
| 2009/0052037 A1 | 2/2009 | Wernersson | |
| 2009/0237517 A1 | 9/2009 | Lam et al. | |
| 2010/0126269 A1 | 5/2010 | Coronato et al. | |
| 2010/0134887 A1 | 6/2010 | Shin | |

(Continued)

FOREIGN PATENT DOCUMENTS

| | | |
|---|---|---|
| KR | 10-2007-0074884 A | 7/2007 |
| KR | 10-2010-0028886 A | 3/2010 |

OTHER PUBLICATIONS

Xia et al., The Development of Micromachined Gyroscope Structure and Circuitry Technology, Jan. 14, 2014, MDPI, Sensors 2014, 1394-1473.

*Primary Examiner* — Justin P. Misleh

(74) *Attorney, Agent, or Firm* — Birch, Stewart, Kolasch & Birch, LLP

(57) ABSTRACT

An exemplary embodiment of the present invention includes a PCB (Printed Circuit Board) mounted with an image sensor, a holder member mounted at the PCB to support a lens module, movable lens concentrically arranged with the lens module, a first actuator compensating movement of an image captured by the image sensor by moving the movable lens, and a gyro sensor unit integrally formed with the first actuator to detect rotation of trajectory in response to movement of an electronic device mounted with the camera module.

8 Claims, 4 Drawing Sheets

(56) References Cited

U.S. PATENT DOCUMENTS

| | | |
|---|---|---|
| 2010/0208089 A1 | 8/2010 | Chang |
| 2011/0075999 A1 | 3/2011 | Chiu |
| 2011/0097062 A1 | 4/2011 | Tsuruta et al. |
| 2011/0217029 A1 | 9/2011 | Wu et al. |
| 2011/0286732 A1 | 11/2011 | Hosokawa et al. |
| 2012/0019675 A1 | 1/2012 | Brown |
| 2012/0069450 A1* | 3/2012 | Bolis .................. G02B 3/14 359/665 |
| 2012/0075519 A1 | 3/2012 | Blasch |
| 2013/0201392 A1* | 8/2013 | Gutierrez ............. G03B 3/10 348/374 |
| 2013/0221195 A1 | 8/2013 | Kennedy |

* cited by examiner

[Fig. 1]
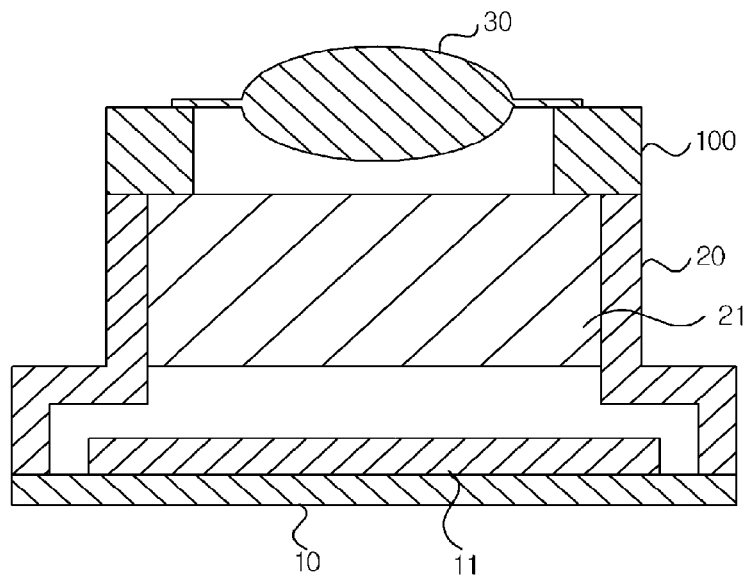
[Fig. 2]
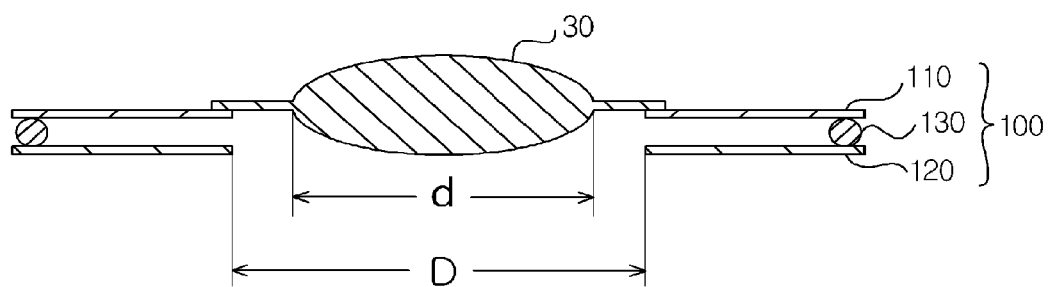

[Fig. 3]
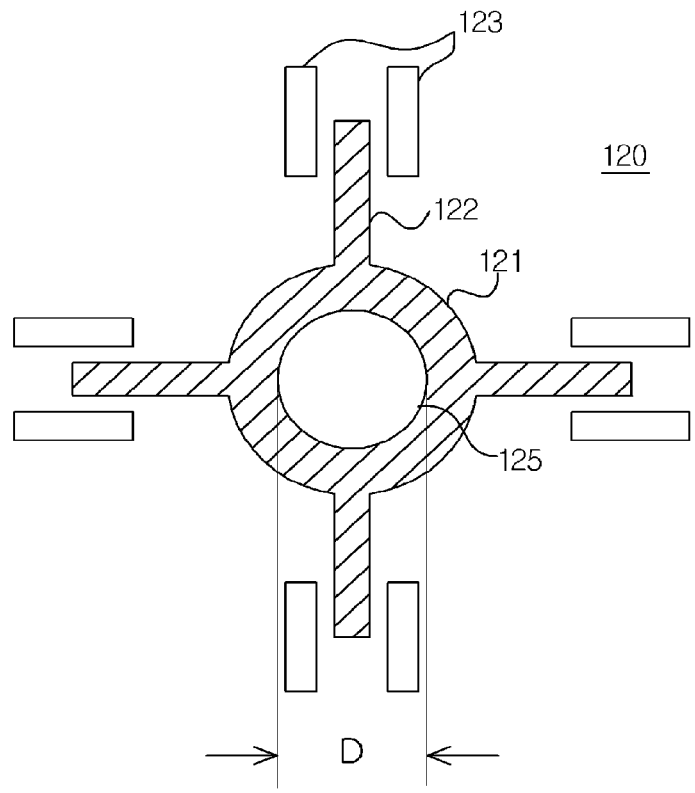
[Fig. 4]
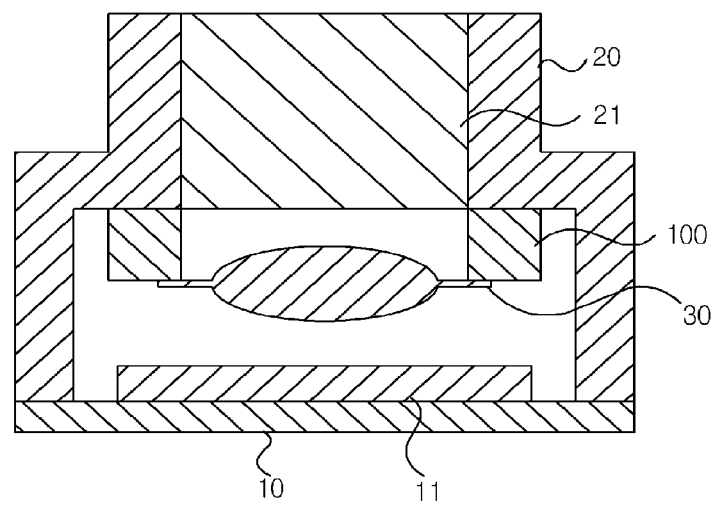

[Fig. 5]
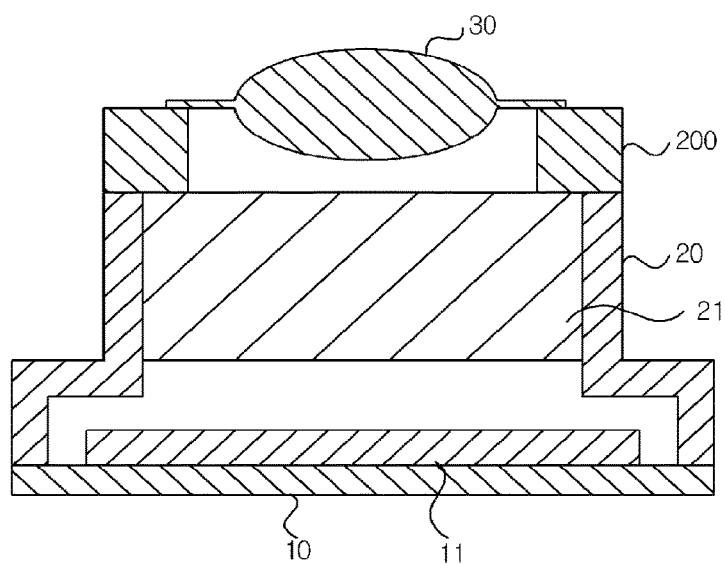
[Fig. 6]
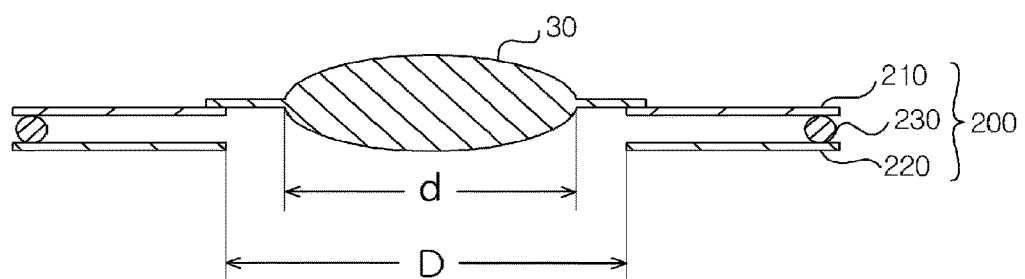

[Fig. 7]
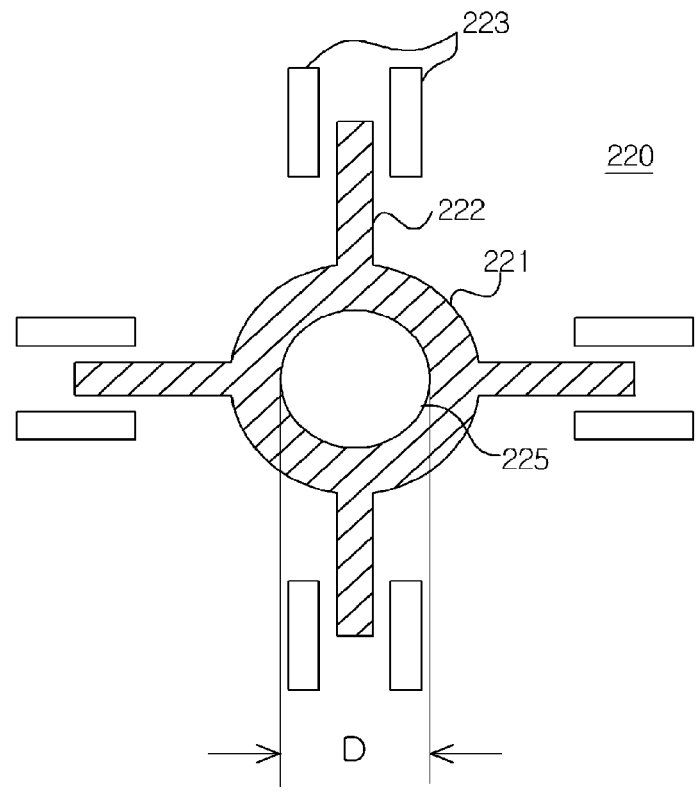
[Fig. 8]
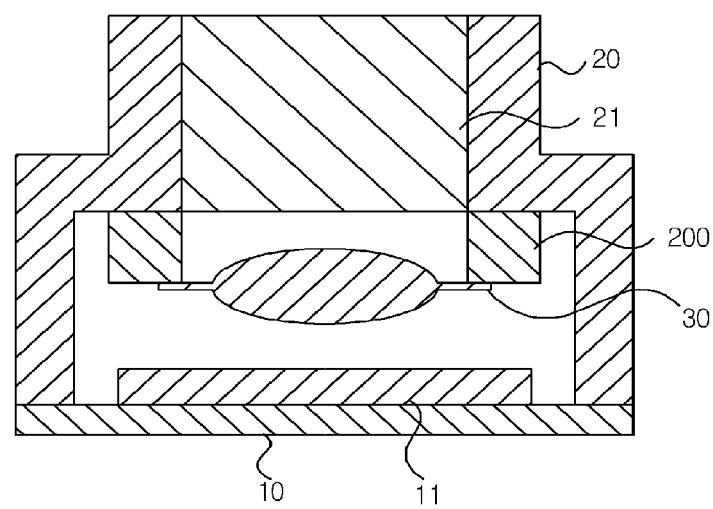

CAMERA MODULE

CROSS-REFERENCE TO RELATED APPLICATIONS

This application is a Continuation of copending U.S. application Ser. No. 14/427,254, filed on Mar. 10, 2015, which is a National Stage of International Application No. PCT/KR2013/000733 filed on Jan. 30, 2013, which claims priority under 35 U.S.C. § 119(a) to Application No. 10-2012-0103939, filed in the Republic of Korea on Sep. 19, 2012, all of which are hereby expressly incorporated by reference into the present application.

TECHNICAL FIELD

The teachings in accordance with exemplary and non-limiting embodiments of this invention relate generally to a camera module.

BACKGROUND ART

Recently, small-sized camera modules are highly demanded in a variety of multimedia fields, such as tablet computers, camera phones, PDAs (Personal Digital Assistants), smart phones, and toys, and image input devices, such as monitoring cameras and information terminals of video tape recorders. Particularly, trends are to develop miniaturized camera modules for smart phones in response to increased demands by consumers preferring a small-sized design.

The camera module is manufactured using an image sensor such as a charge coupled device (CCD) or a complementary metal oxide semiconductor (CMOS), where light of an object is concentrated through a lens to the image sensor, and an optical signal is converted into an electrical signal for display on a display unit such as an LCD display device. Meanwhile, smart phones are generally mounted with various detection sensors capable of variably detecting motions of a user.

However, in order to install a gyro sensor as a separate detection sensor, a separate space is required, and the installation of an additional space unit for the gyro sensor in portable electronic devices such as smart phones is cumbersome.

DISCLOSURE OF INVENTION

Technical Problem

Accordingly, it is an object of the present invention to provide a structurally improved camera module capable of being packaged therein along with a gyro sensor.

Solution to Problem

In order to accomplish the above object, in one general aspect of the present invention, there is provided a camera module, the camera module comprising: a PCB (Printed Circuit Board) mounted with an image sensor; a holder member mounted at the PCB to support a lens module; movable lens concentrically arranged with the lens module; a first actuator compensating movement of an image captured by the image sensor by moving the movable lens; and a gyro sensor unit integrally formed with the first actuator to detect rotation of trajectory in response to movement of an electronic device mounted with the camera module.

Preferably, but not necessarily, the first actuator may include a first movable unit supporting the movable lens, and the first movable unit and the gyro sensor unit may be conductibly connected via a first connection member.

Preferably, but not necessarily, the first connection member may be formed with any one material of gold material and conductive material.

Preferably, but not necessarily, the gyro sensor unit may include a body centrally formed with a through hole, a plurality of sensing lugs protrusively formed at a periphery of the body, and a sensing unit arranged at a surface corresponding to the plurality of sensing lugs.

Preferably, but not necessarily, the through hole may be formed with a diameter greater than a diameter of the lens module.

Preferably, but not necessarily, the body may be provided in a shape of a ring and centrally formed with the through hole.

Preferably, but not necessarily, at least four (4) sensing lugs may be formed at the periphery of the body.

Preferably, but not necessarily, the plurality of sensing lugs may be discretely arranged each at a predetermined same distance.

Preferably, but not necessarily, the sensing unit may be arranged opposite to at least two surfaces of the sensing lugs.

Preferably, but not necessarily, the sensing unit may be conductively connected to the PCB.

Preferably, but not necessarily, the first actuator may be arranged at any one of an upper surface of the holder member, and between the holder member and the PCB.

In another general aspect of the present invention, there is provided a camera module, the camera module comprising: a PCB (Printed Circuit Board) mounted with an image sensor; a holder member mounted at the PCB to support a lens module; movable lens concentrically arranged with the lens module; a second actuator adjusting a focus of an image captured on the image sensor by moving the movable lens; and an acceleration sensor unit integrally formed with the second actuator to detect acceleration in response to movement of an electronic device mounted with the camera module.

Preferably, but not necessarily, the second actuator may include a second movable unit supporting the movable lens, and the second movable unit and the acceleration sensor unit are conductibly connected via a second connection member.

Preferably, but not necessarily, the second connection member may be formed with any one material of gold material and conductive material.

Preferably, but not necessarily, the acceleration sensor unit may include a ring-shaped body centrally formed at the acceleration sensor unit and formed with a diameter greater than a diameter of the lens module, a plurality of sensing lugs, at least four (4) sensing lugs discretely arranged at a periphery of the body, each at a predetermined same distance, and a sensing unit arranged at a position corresponding to that of the plurality of sensing lugs and arranged opposite to at least two (2) surfaces of the sensing lugs.

In another general aspect of the present invention, there is provided a camera module, the camera module comprising: a PCB (Printed Circuit Board) mounted with an image sensor; a holder member mounted at the PCB to support a lens module; movable lens concentrically arranged with the lens module; a first actuator compensating shake of an image captured by the image sensor by moving the movable lens; and a gyro sensor unit integrally formed with the first actuator to detect rotation of trajectory in response to movement of an electronic device mounted with the camera module, a second actuator adjusting a focus of an image captured on the image sensor by moving the movable lens; and an acceleration sensor unit integrally formed with the second actuator to detect acceleration in response to movement of an electronic device mounted with the camera module.

Advantageous Effects of Invention

A camera module according to an exemplary embodiment of the present invention has an advantageous effect in that a gyro sensor can be packaged along with an actuator of the camera module to install the gyro sensor on an electronic device without increasing volume of the camera module.

Another advantageous effect is that the actuator and the gyro sensor are so arranged as to share a wiring to simplify a wiring structure.

BRIEF DESCRIPTION OF DRAWINGS

FIG. 1 is a schematic view illustrating a configuration of a camera module according to a first exemplary embodiment of the present invention.

FIG. 2 is an enlarged view illustrating a first actuator of FIG. 1.

FIG. 3 is a schematic plane view illustrating a gyro sensor unit of FIG. 2.

FIG. 4 is a schematic view illustrating a configuration of a camera module according to a second exemplary embodiment of the present invention.

FIG. 5 is a schematic view illustrating a configuration of a camera module according to a third exemplary embodiment of the present invention.

FIG. 6 is an enlarged view illustrating a second actuator of FIG. 5.

FIG. 7 is a schematic plane view illustrating an acceleration sensor unit of FIG. 5.

FIG. 8 is a schematic view illustrating a configuration of a camera module according to a fourth exemplary embodiment of the present invention.

BEST MODE FOR CARRYING OUT THE INVENTION

Now, the camera module according to exemplary embodiments of the present invention will be described in detail with reference to the accompanying drawings.

FIG. 1 is a schematic view illustrating a configuration of a camera module according to a first exemplary embodiment of the present invention, FIG. 2 is an enlarged view illustrating a first actuator of FIG. 1, FIG. 3 is a schematic plane view illustrating a gyro sensor unit of FIG. 2, FIG. 4 is a schematic view illustrating a configuration of a camera module according to a second exemplary embodiment of the present invention, FIG. 5 is a schematic view illustrating a configuration of a camera module according to a third exemplary embodiment of the present invention, FIG. 6 is an enlarged view illustrating a second actuator of FIG. 5, FIG. 7 is a schematic plane view illustrating an acceleration sensor unit of FIG. 5, FIG. 8 is a schematic view illustrating a configuration of a camera module according to a fourth exemplary embodiment of the present invention.

FIG. 1 is a schematic view illustrating a configuration of a camera module according to a first exemplary embodiment of the present invention.

Referring to FIG. 1, the camera module may include a PCB (10), a holder member (20), a movable lens (30) and a first actuator (100).

The PCB (10) may be mounted at an approximate center thereof with an image sensor (11), and may be also mounted at a surface with a controller reading out image information and outputting data on the image sensor (11) and the first actuator (100) and a control signal. At this time, the PCB (10) may supply the control signal and the power to the first actuator (100) by being directly connected to an electronic circuit pattern layer formed at the holder member (20), and may also supply the control signal and the power to the first actuator (100) by being connected to a separate wiring member.

The holder member (20) may be arranged at an upper surface of the PCB (10) and a lens module (21) formed with at least one or more sheets of lenses may be coupled to an interior of the holder member (20). The lens module (21) may be screw-coupled to an interior of the holder member (20) or may be fixed to the interior of the holder member (21) using an adhesive. The holder member (20) may be installed with the first actuator (100) for automatically adjusting a focus of an image captured on the image sensor (11), may be arranged at an upper surface of the lens module (21) as shown in FIG. 1, or may be arranged at a bottom surface of the lens module (21) between the lens module (21) and the image sensor (11) as illustrated in FIG. 4.

Furthermore, the holder member (20) may be formed at a surface thereof with an electronic circuit pattern layer (not shown) conductibly connecting the first actuator (100) to the PCB (10) or may be provided with a separate wiring member. The electronic circuit pattern layer may be so formed as to have a wiring pattern on the surface, may be installed at any one or more places of a lateral wall, an upper surface or a bottom surface of the holder member (20), or may be installed at the lateral wall, the upper surface and the bottom surface at the same time. The electronic circuit pattern layer may be formed using so-called MID (Molded Interconnect Device) technology. The wiring member may be a CF-PCB or a flexible cable, where one end may be connected to the PCB (10), and the other end may be connected to the first actuator (100).

The movable lens (30) may perform an auto focusing function by vertically moving relative to an optical axis by the first actuator (100), or may perform handshake compensation function by tilting or shifting operation. Alternatively, the movable lens may be formed with an optically transmissive material such as silicon or similar material, or thickness of the movable lens may be variably formed by the first actuator (100). In this case, a refractive index of light passing the movable lens (30) may be adjusted to perform the auto focusing function or the handshake compensation function.

The first actuator (100) serves to accurately control a focus of an image captured by the image sensor (11) or the shake by providing a motion to the movable lens (30), and may include, according to an exemplary embodiment of the present invention, a first movable unit (110), a gyro sensor unit (120) and a first connection member (130) as illustrated in FIG. 2.

The first movable unit (110) may be coupled to the movable lens (30) to compensate an image instability or error caused by handshake by shifting the movable lens (30) to a horizontal direction relative to an optical axis, or by tilting the movable lens (30) at a predetermined angle relative to the optical axis. The first movable unit (110) may be provided in various configurations and may be provided in a form of a handshake compensation unit according to an exemplary embodiment of the present invention. The first movable unit (110) may be fixedly installed at an upper surface of the holder member (20). However, the present invention is not limited thereto, and the installation position of the first movable unit (110) may be changed depending on design of the camera module.

The first movable unit (110) may be also configured to implement auto focusing function, zoom function and shutter function in addition to the handshake compensation function. The first movable unit (110) may be replaced by any actuator controllable of one sheet of lens like an actuator using a piezoelectric polymer moved by electrostatic force or piezoelectric force. By way of non-limiting example, the actuator may be replaced by any one of a silicon type actuator, a liquid lens, or any actuator alone, or in combination with each other.

Referring to FIGS. 2 and 3, the gyro sensor unit (120) may be provided to form a one-bodied first actuator (100) by the first movable unit (110) and the first connection member (130) being conductibly connected. Referring to FIG. 3, the gyro sensor unit (120) may include a ring-shaped body (121) centrally formed with a through hole (125), a sensing lug (122) protrusively formed to all directions of the body (121) and a pair of sensing units (123) arranged in opposition to the sensing lug (122). At this time, the sensing lug (122) and the sensing unit (123) may be provided in a plural number, and as illustrated in FIG. 3, four (4) sensing lugs (122) may be arranged each at a 90° interval, and the sensing unit (123) may be arranged at a position corresponding to that of the sensing lug (122).

Referring to FIGS. 2 and 3 again, a diameter (D) of the through hole (125) may be greater than a diameter (d) of the movable lens (30) to prevent the through hole (125) from being interfered by light passing the movable lens (30).

Furthermore, a center of the through hole (125) and a center of the movable lens (30) may be concentrically arranged, which is to prevent the movable lens (30) from being shaded by the body (121) of the gyro sensor unit (120) integrally formed with the first actuator (100) coupled to the camera module in response to motion of the camera module. That is, in a case the body (121) is moved, an angle of trajectory is detected by detecting the sensing lug (122) and the sensing unit (123) being distanced or being approached. At this time, in a case the center of the through hole (125) and the center of the movable lens (30) fail to be concentrically arranged, the body (121) may shade a part of the movable lens (30).

The first connection member (130) serves to conductibly connect the first actuator unit (110) to the gyro sensor unit (120), and may be formed with a gold material or a conductive material according to an exemplary embodiment of the present invention. The first connection member (130) connects an electronic circuit of the movable lens (30) to an electronic circuit of the gyro sensor unit (120) to allow being directly connected to the PCB (10) dispensing with a separate wiring member, whereby a power may be supplied to the gyro sensor unit (120) installed inside the first actuator (100) or a control signal may be received or transmitted without increasing the volume of the camera module. Generally, an electronic circuit pattern is formed on each of the first movable unit (110) and the gyro sensor unit (120) for driving the first movable unit (110) and the gyro sensor unit (120), such that, in a case a pattern is further added to the existing electronic circuit pattern for mutual power supply and application of control signal, the power and control signal can be supplied via connection between the electronic circuit pattern and the additional pattern without a separate wiring member.

FIG. 4 is a schematic view illustrating a configuration of a camera module according to a second exemplary embodiment of the present invention.

The configuration of a camera module illustrated in FIG. 4 is no big difference from that of the first exemplary embodiment of the present invention, except that the first actuator (100) may be arranged at a space unit between the holder member (20) and the PCB (10), the gyro sensor unit (120) may be fixed to a floor surface of the holder member (20) and the first movable unit (110) supporting the movable lens (30) may be arranged thereunder. Other configurations and operations are the same as those of the first exemplary embodiment of the present invention.

In the above configuration according to the second exemplary embodiment of the present invention, the first actuator (100) mounted on a camera module is configured with the first movable unit (110) along with the gyro sensor unit (120) recommended in installation for an accurate operation control in a portable electronic device such as a smart phone, whereby there is no need of forming a separate space unit for installing the gyro sensor unit (120) on the electronic device mounted with the camera module. Furthermore, a process of installing the gyro sensor unit (120) is eliminated and only a configuration of installing the camera module is needed to allow installing the camera module and the gyro sensor unit (120) at one time, whereby productivity can be enhanced and assembly badness can be minimized.

FIG. 5 is a schematic view illustrating a configuration of a camera module according to a third exemplary embodiment of the present invention.

The configuration of a camera module illustrated in FIG. 5 is same as that of the second exemplary embodiment of the present invention, except that the first actuator (100, see FIG. 1) is changed to a second actuator (200).

The second actuator (200) is an auto focusing unit providing a motion to the movable lens (30) to adjust a focus of an image captured by the image sensor (11), and may include a second movable unit (210), an acceleration sensor unit (220) and a second connection member (230) as illustrated in FIG. 6.

The second movable unit (210) may be coupled to the movable lens (30) to move the movable lens (30) to a direction parallel with the optical axis, whereby a focus can be adjusted. The second movable unit (210) may be fixedly installed at an upper surface of the holder member (20). However, the present invention is not limited thereto, and the installation position of the second movable unit (210) may be variably changed depending on design of the camera module. The second movable unit (210) may be also configured to implement auto focusing function, zoom function and shutter function in addition to the handshake compensation function. The second movable unit (210) may be replaced by any actuator controllable of one sheet of lens like an actuator using a piezoelectric polymer moved by electrostatic force or piezoelectric force. By way of non-limiting example, the actuator may be replaced by any one of a silicon type actuator, a liquid lens, or any actuator alone, or in combination with each other.

The acceleration sensor unit (220) may be formed in the same configuration as that of the gyro sensor unit (120) illustrated in FIG. 3, and may be provided to form a one-bodied second actuator (200) by the second movable unit (210) and the second connection member (230) being conductibly connected. The acceleration sensor unit (220)

functions to output a magnitude of acceleration applied to an object, and may be divided into different types depending on the number of axis, e.g., one axis, two axes and three axes, where a 3-axis acceleration sensor having a 3-axis direction as a detection range may measure acceleration in a 3D (Dimensional) space of a 3-axis direction of x axis, y axis and z axis. That is, the 3-axis acceleration sensor can detect a motion of an object using an inclined angle of the object and acceleration of each direction based on gravitational acceleration. The acceleration sensor unit (220) capable of detecting the 3-axis directions may be configured for detecting an inclined angle of an electric device, e.g., a portable phone, mounted on a camera module according to an exemplary embodiment of the present invention.

The acceleration sensor unit (220) may be configured by piezo-resistive resistance or capacitive accelerometer, and the acceleration sensor unit (220) configured by the capacitive accelerometer is exemplified in the exemplary embodiment of the present invention. The acceleration sensor unit (220) configured by the capacitive accelerometer is configured such that a balance weight is centrally arranged between a plurality of electrodes, and in a case there is no acceleration, the balance weight is positioned in the center, and in a case there is applied with acceleration, the balance weight is moved from the center to an opposite electrode to measure acceleration using a current value generated by difference of electrostatic capacity.

That is, the acceleration sensor unit (220) acting responsive to the balance weight as illustrated in FIG. 7 may include a ring-shaped body (221) centrally formed with a through hole, a sensing lug (222) protrusively formed to all directions of the body (221) and a pair of sensing units (223) arranged in opposition to the sensing lug (222) to act as an electrode. At this time, the sensing lug (222) and the sensing unit (223) may be provided in a plural number, and as illustrated in FIG. 7, four (4) sensing lugs (222) may be arranged each at a 90° interval, and the sensing unit (223) may be arranged at a position corresponding to that of the sensing lug (222).

Referring to FIGS. 6 and 7, a diameter (D) of the through hole (225) may be greater than a diameter (d) of the movable lens (30) to prevent the through hole (225) from being interfered by light passing the movable lens (30).

Furthermore, a center of the through hole (225) and a center of the movable lens (30) may be concentrically arranged, which is to prevent the movable lens (30) from being shaded by the body (221) of the acceleration sensor unit (220) integrally formed with the second actuator (200) coupled to the camera module in response to motion of the camera module. That is, in a case the body (221) is moved, an angle of trajectory is detected by detecting the sensing lug (222) and the sensing unit (223) being distanced or being approached. At this time, in a case the center of the through hole (225) and the center of the movable lens (30) fail to be concentrically arranged, the body (221) may shade a part of the movable lens (30) as the body (221) is moved.

The second connection member (230) serves to conductibly connect the second actuator unit (210) to the acceleration sensor unit (220), and may be formed with a gold material or a conductive material according to an exemplary embodiment of the present invention. The second connection member (230) connects an electronic circuit of the second movable unit (210) to an electronic circuit of the acceleration sensor unit (220) to allow being directly connected to the PCB (10) dispensing with a separate wiring member, whereby a power may be supplied to the acceleration sensor unit (220) installed inside the second actuator (200) or a control signal may be received or transmitted without increasing the volume of the camera module. Generally, an electronic circuit pattern is formed on each of the second movable unit (210) and the acceleration sensor unit (220) for driving the second movable unit (210) and the acceleration sensor unit (220), such that, in a case a pattern is further added to the existing electronic circuit pattern for mutual power supply and application of control signal, the power and control signal can be supplied via connection between the electronic circuit pattern and the additional pattern without a separate wiring member.

FIG. 8 is a schematic view illustrating a configuration of a camera module according to a fourth exemplary embodiment of the present invention.

The configuration of a camera module illustrated in FIG. 8 is no big difference from that of the second exemplary embodiment of the present invention, except that the second actuator (200) may be arranged at a space unit between the holder member (20) and the PCB (10), the acceleration sensor unit (220) may be fixed to a floor surface of the holder member (20) and the second movable unit (210) supporting the movable lens (30) may be arranged thereunder. Other configurations and operations are the same as those of the third exemplary embodiment of the present invention.

In the above configuration according to the fourth exemplary embodiment of the present invention, the first actuator (100) mounted on a camera module may be configured with the first movable unit (110) performing handshake compensation function along with the gyro sensor unit (120) recommended in installation for an accurate operation control in a portable electronic device such as a smart phone, and the second actuator (200) may be configured with the acceleration sensor unit (220) along with the second movable unit (210) performing the auto focusing function, whereby there is no need of forming a separate space unit for installing the gyro sensor unit (120) or the acceleration sensor unit (220) on the electronic device mounted with the camera module.

Particularly, in case of requiring a handshake compensation function, the first actuator (100) is installed as in the first and second exemplary embodiments, and in case of requiring posture difference compensation, the second actuator (200) is installed as in the third and fourth exemplary embodiments, whereby the handshake compensation function or the posture difference compensation of an electronic device can be provided only with the installation of a camera module.

Furthermore, a process of installing the gyro sensor unit (120) or the acceleration sensor unit (220) is eliminated and only a configuration of installing the camera module is needed to allow installing the camera module and the gyro sensor unit (120) or the acceleration sensor unit (220) at one time, whereby productivity can be enhanced and assembly badness can be minimized.

Meanwhile, although the first and second exemplary embodiments have explained and described the first actuator (100) integrally formed with the gyro sensor unit (120), and the third and fourth exemplary embodiments have explained and described the second actuator (200) integrally formed with the acceleration sensor unit (220), the present invention is not limited thereto. By way of non-limiting example, albeit not being illustrated, according to a fifth exemplary embodiment of the present invention, the first and second actuators (100, 200) according to the first to fourth exemplary embodiments may be configured in one unit to implement the handshake compensation function and the auto focusing function at the same time. In this case, it is possible to integrally form the first actuator (100) with the acceleration sensor unit (220), and to integrally form the second actuator (200) with the gyro sensor unit (120).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to exemplary embodiments of the present invention has an industrial applicability in that it can be applied to a camera module mounted at small electronic devices such as a mobile terminal and a tablet PC.

The invention claimed is:

1. A camera module, the camera module comprising:
a PCB (Printed Circuit Board) mounted with an image sensor;
a holder member disposed on the PCB;
a lens module coupled with the holder member, the lens module including one or more lenses;
a sensor unit disposed on the holder member;
a liquid lens disposed on the sensor unit;
a connection member disposed between the sensor unit and the liquid lens; and
a movable lens concentrically arranged with and coupled to the liquid lens,
wherein the sensor unit includes a body centrally formed with a through hole, a plurality of sensing lugs protrusively formed at a periphery of the body, and a sensing unit arranged at a surface corresponding to the plurality of sensing lugs,
wherein the sensor unit detects movement of an electronic device mounted with the camera module,
wherein the sensing unit is provided spaced apart from and separate from the body,
wherein the liquid lens is configured to implement at least one function of a focusing function, a zoom function and a handshake compensation function by moving the movable lens, and
wherein the connection member electrically connects the sensor unit and the liquid lens and is electrically connected to the PCB.

2. The camera module of claim 1, wherein the through hole is formed with a diameter greater than a diameter of the lens module.

3. The camera module of claim 1, wherein the body is provided in a shape of a ring and centrally formed with the through hole.

4. The camera module of claim 1, wherein at least four sensing lugs are formed at the periphery of the body.

5. The camera module of claim 4, wherein the four sensing lugs are discretely arranged each at a predetermined same distance.

6. The camera module of claim 1, wherein the sensing unit is arranged opposite to at least two surfaces of the sensing lugs.

7. The camera module of claim 1, wherein the sensor unit is any one of a gyro sensor unit and an acceleration sensor unit.

8. The camera module of claim 1, wherein the liquid lens and the connection member are disposed above or below the lens module.

* * * * *